United States Patent Office 2,931,779
Patented Apr. 5, 1960

2,931,779

PREPARATION OF ALUMINA SOLS

John F. White, Medford, Mass., assignor to Monsanto Chemical Company, St. Louis, Mo., a corporation of Delaware No Drawing. Application June 21, 1952
Serial No. 294,914

5 Claims. (Cl. 252—313)

The present invention relates to novel alumina sols, particularly alumina aquasols which are stable for practical periods of time, and to methods of making such sols.

It has been proposed heretofore to prepare alumina hydrosols or aquasols by peptizing aluminum hydrate in water with hydrochloric acid. The resulting hydrosols are quite unstable except at low alumina concentrations, and the alumina separates out as a floc or as gel particles on standing at normal room temperatures. The hydrosols having a small amount of alumina therein generally lack utility, whereas the more concentrated hydrosols cannot be prepared and stored for any reasonable periods of time because they lack stability.

It is accordingly one object of this invention to provide relatively concentrated alumina hydrosols or aquasols which are stable for suitable periods of time.

It is a further object of this invention to provide a method or process for preparing such hydrosols or aquasols.

It is a further object of this invention to provide a stable and relatively concentrated alumina aquasol without interfering with the utility of the alumina in such aquasol.

Still further objects and advantages of this invention will become apparent from the following description and the appended claims.

The processes of this invention are carried out, in general, by peptizing aluminum hydrate (aluminum hydroxide) in water with a strong mineral acid such as hydrochloric acid or a strong organic acid such as acetic acid in the presence of sufficient gelatin to stabilize the resulting alumina sol.

In carrying out such processes it is possible to use varying concentrations of aluminum hydrate in water, for example, from about 1 to 25 parts by weight (calculated as $Al_2O_3$) for each 100 parts by weight of water. In the absence of gelatin the peptized aluminum hydrate sols usually gel at 10 to 12% by weight of alumina, but by the use of gelatin it is possible to prepare stable sols at concentrations above 10% by weight of alumina, and as high as 20% by weight of alumina.

The aluminum hydrate employed need not consist of aluminum hydroxide, since satisfactory results are also obtained if the aluminum hydroxide is partially dehydrated. However, it is preferable to use aluminum hydroxide, and it is desirable to use an aluminum hydrate which contains at least 70% by weight of aluminum hydroxide.

The amount of strong mineral or organic acid used to peptize the aluminum hydrate may be varied considerably depending on the pH desired in the final sol. In general, the minimum amount of acid used may vary from 1 to 5% equivalent of acid on the alumina content of the aluminum hydrate. The term "equivalent" as used herein is intended to mean the total mols of hydrochloric acid or other acid required to react with 1 mol of $Al_2O_3$, namely 6 mols of hydrochloric acid, 3 mols of sulfuric acid or 6 mols of acetic acid. When the minimum amount of peptizing acid is used the sol obtained has a pH between about 5 and 7, and this pH is preferred for most uses of the sol. However, it is possible to use larger equivalents of acid to peptize the hydrated alumina particularly if a lower pH is not objectionable, but the amount of acid used should be insufficient to form a true solution of an aluminum salt.

A variety of strong acids may be used in preparing the sols of this invention, including strong mineral acids such as hydrochloric, sulfuric and nitric acid and strong organic acids such as acetic, formic, monochloracetic, trichloracetic acid, hydroxyacetic acids and the like. However, in most instances with the exception of sulfuric and phosphoric acids the strong mineral acids give superior sols, and since such acids also are cheap they are preferred. Moreover, among the various mineral acids hydrochloric acid gives the best results and is preferred.

In carrying out the preparation of the sols of this invention, it is possible to peptize aluminum hydrate in water with an acid of the type described in the absence of gelatin, and the gelatin, in such cases, need only be added after the alumina sol is formed. However, such procedure is not as satisfactory for producing stable, concentrated alumina sols as the procedure wherein the peptization of the aluminum hydrate is carried out in the presence of gelatin. Ordinarily, concentrated sols of high stability are most readily obtained when the aluminum hydrate and gelatin are present in the water prior to the addition of the peptizing acid, and this procedure is preferred. The peptization of the aluminum hydrate either in the presence or absence of gelatin is primarily influenced by temperature, agitation, the particle size of the hydrate and the concentration of aluminum hydrate and acid. Temperatures between 20 and 60° C. are preferred, but higher temperatures aid in peptizing the aluminum hydrate especially with higher acid concentrations. If temperatures above 65° C. are used, however, with minimum amounts of peptizing acid it is not possible, in some instances, to obtain a stable sol even when gelatin is employed. Stirring or agitation (especially high speed agitation) also aids in peptizing aluminum hydrate and is therefore preferred.

The amount of gelatin which is used to stabilize the alumina sols may be varied considerably depending primarily on the alumina concentration of the sol, the use for which the sol is intended and the acidity of the sol. Satisfactory results are obtained in most instances by using from about 1 to 25% by weight of gelatin, based on the aluminum hydrate solids (calculated as $Al_2O_3$). However, it is also possible to use as low as 0.5% of gelatin in dilute alumina sols, and the upper limit of gelatin is governed by its solubility in water and the use for which the sol is intended. Generally, if it is desired not to mask the effect of the alumina in the sol, it is preferable not to use more than 30% by weight of gelatin, based on the aluminum hydrate solids (calculated at $Al_2O_3$). The gelatin is preferably added to the sol or water dispersion of aluminum hydrate in the form of a water solution.

The sols described herein contain positively charged, colloidal, hydrated alumina particles in the presence or absence of gelatin under acidic conditions. These sols are exceedingly stable, that is, they have a shelf life of 6 months or longer at concentrations of 2 to 5% by weight of alumina under acidic conditions and are capable of being diluted with water without precipitation of alumina. They may be used for various purposes, for example, for treating textile fibres to increase the inter-fiber friction or the manipulative characteristics of the fibers. The sols may also be used for coating glass or for coating molds used in precision casting.

Various water-soluble substances may be added to the sols of this invention to improve its properties for textile application. For example, small amounts of liquid, water-soluble organic hydroxy and epoxy compounds such as glycerine, epichlorhydrin, ethylene glycol, diethylene glycol and the like may be used, as well as water-soluble natural gums or polysaccharides. The preferred additives are glycerine and epichlorhydrin.

A further understanding of the sols and processes of this invention will be obtained from the following examples which are intended to illustrate the present invention, but not to limit the scope thereof, parts and percentages being by weight unless otherwise specified.

*Example I*

Two and six-tenths parts of low density aluminum hydrate were stirred in 100 parts of water with 2% U.S.P. gelatin, based on the aluminum hydrate, until the gelatin was dissolved. One equivalent percent (0.0093 part) of hydrogen chloride in the form of concentrated hydrochloric acid, based on the alumina ($Al_2O_3$) content of the aluminum hydrate, was added to the aluminum hydrate suspension and the suspension was subjected to high speed agitation in a Waring Blendor for a period of 10 minutes. At the end of this time an alumina aquasol was obtained which was stable, without appreciable floc or gel formation, for a period of at least two months. The alumina sol had a pH of about 5 to 6 and contained positively charged, hydrated colloidal particles.

*Example II*

Two and six-tenths parts of low density aluminum hydrate were stirred in 100 parts of water with 5% of U.S.P. gelatin, based on the aluminum hydrate, until the gelatin was dissolved. Five equivalent percent (0.037 part) of 100% formic acid, based on the alumina ($Al_2O_3$) content of the aluminum hydrate, was added to the aluminum hydrate suspension and the suspension was subjected to high speed agitation in a Waring Blendor for a period of 15 minutes. At the end of this time an alumina aquasol was obtained which had a pH of about 6 and was substantially as stable as the alumina aquasol of Example I. This aquasol also contained positively charged, hydrated alumina particles.

Various changes and modifications may be made in the sols and processes described herein as will be apparent to those skilled in the art to which the present invention appertains without departing from the spirit and intent of the present invention. Accordingly, it is not intended that this invention should be restricted except by the scope of the appended claims.

What is claimed is:

1. A process of making relatively stable alumina sols which comprises agitating a suspension of aluminum hydrate in water containing dissolved therein from 1 to 25% by weight of gelatin, based on the aluminum hydrate solids, with 1 to 5 equivalent percent of a strong mineral acid, based on the aluminum hydrate (calculated as $Al_2O_3$), until an alumina aquasol is obtained, said aluminum hydrate being employed in an amount to provide an alumina sol containing above 10% by weight and up to 20% by weight of alumina.

2. A process as in claim 1, but further characterized in that said acid is hydrochloric acid.

3. A process as in claim 1, but further characterized in that said acid is nitric acid.

4. A process of making relatively stable alumina sols which comprises agitating a suspension of aluminum hydrate in water with from about 1 to 5 equivalent percent of an acid selected from the group consisting of strong mineral acids and strong organic acids, based on the aluminum hydrate (calculated as $Al_2O_3$) in the presence of from 1 to 25% by weight of gelatin, based on the aluminum hydrate solids, until an alumina aquasol is obtained, said aluminum hydrate being employed in an amount to provide an alumina sol containing above 10% by weight and up to 20% by weight of alumina.

5. A process of making relatively stable alumina sols which comprises agitating a suspension of aluminum hydrate in water containing dissolved therein from 1 to 25% by weight of gelatin, based on the aluminum hydrate solids, with 1 to 5 equivalent percent of hydrochloric acid, based on the aluminum hydrate (calculated as $Al_2O_3$), at a temperature of 20 to 60° C. until an alumina aquasol is obtained, said aluminum hydrate being employed in an amount sufficient to provide from about 10% up to 20% by weight of alumina in said alumina aquasol.

References Cited in the file of this patent

UNITED STATES PATENTS

| | | |
|---|---|---|
| 2,085,129 | Stoewener | June 29, 1937 |
| 2,163,922 | Stoewener | June 27, 1939 |
| 2,166,868 | Jones | July 18, 1939 |
| 2,590,833 | Bechtold et al. | Apr. 1, 1952 |